Aug. 13, 1957  C. G. AGLE ET AL  2,802,506
LEDGE METHOD FOR SECURING REPAIR PATCHES IN TIRE
Filed Dec. 14, 1954  2 Sheets-Sheet 1

INVENTORS
CARLTON G. AGLE
WILLIAM HRUBIK
BY
W. A. Fraser
ATTY.

Aug. 13, 1957  C. G. AGLE ET AL  2,802,506
LEDGE METHOD FOR SECURING REPAIR PATCHES IN TIRE
Filed Dec. 14, 1954  2 Sheets-Sheet 2
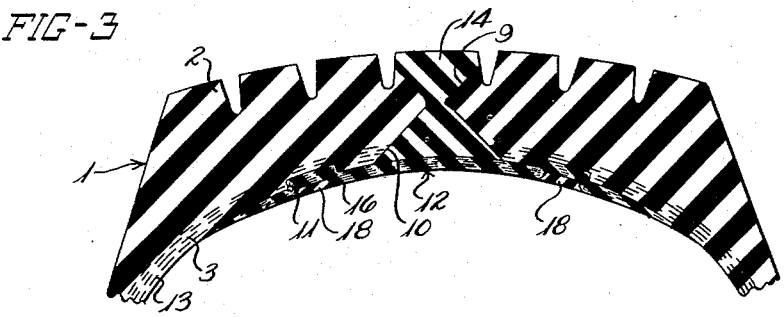
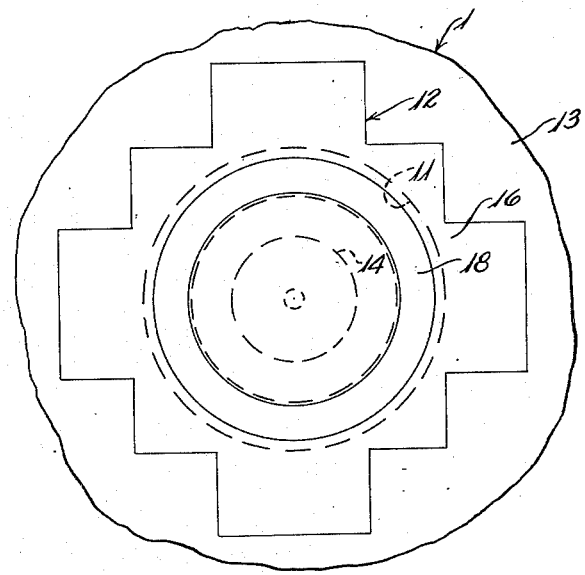
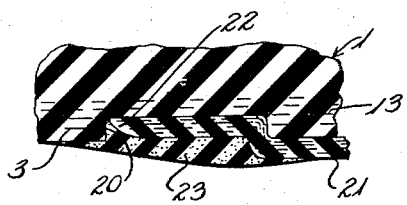
INVENTORS
CARLTON G. AGLE
WILLIAM HRUBIK
BY
W. A. Fraser
ATTY.

United States Patent Office 2,802,506
Patented Aug. 13, 1957

2,802,506

LEDGE METHOD FOR SECURING REPAIR PATCHES IN TIRE

Carlton G. Agle and William Hrubik, Akron, Ohio, assignors to The Firestone Tire & Rubber Company, Akron, Ohio, a corporation of Ohio Application December 14, 1954, Serial No. 475,028

6 Claims. (Cl. 152—367)

This invention relates to means for securing a tire repair patch to the fabric body of an open bellied tire in such a manner that the patch will not pull loose during operation of the tire.

To repair breaks in the fabric body of vehicle tires, it has been customary to cut away the broken fabric and rubber to shape a hole through the tire at the break. The fabric body and the rubber tread often are cut or skived on an angle so that the hole when viewed in section has an hour glass shape. The sides of the hole and the inner most or band ply of the tire around the hole opening are cemented with rubber cement and the hole is filled with tacky unvulcanized vulcanizable rubber after which a fabric patch either of laminated pieces of unvulcanized rubberized cord fabric or of semicured rubberized cord fabric is placed over the hole to cover the tacky rubber as well as the surrounding cemented surface of the band ply of the tire. The fabric patch is carefully stitched or pressed into engagement with the cemented surface of the band ply and the edges of the patch are covered with thin strips of tacky unvulcanized rubber. The repair and the entire section of the tire around the repair is vulcanized with heat and pressure in a conventional manner and the tire returned to road service.

An undesirable feature of this method of tire repair is that during road operation of the repaired tire the edges of the patch pull away from the band ply on the belly of the tire.

The present invention eliminates this undesirable occurrence by providing a recess in the fabric tire body around the band ply opening of the hole into which the edges of the fabric patch are counter-sunk or locked by vulcanization.

It is, therefore, an object of the invention to provide means for permanently securing a repair patch to the fabric body of a damaged tire.

It is also an object of the invention to provide a method of applying a fabric repair patch to the fabric body portion of an injured tire.

It is also an object of the invention to provide an improved repair for an injured tire.

These and other objects will become more apparent by reference to the specification, claims and drawings of which:

Figure 3 is a fragmentary transverse sectional view of the tire repair after vulcanization;

Figure 4 is a plan view of the repair of Figure 3;

Figure 1:
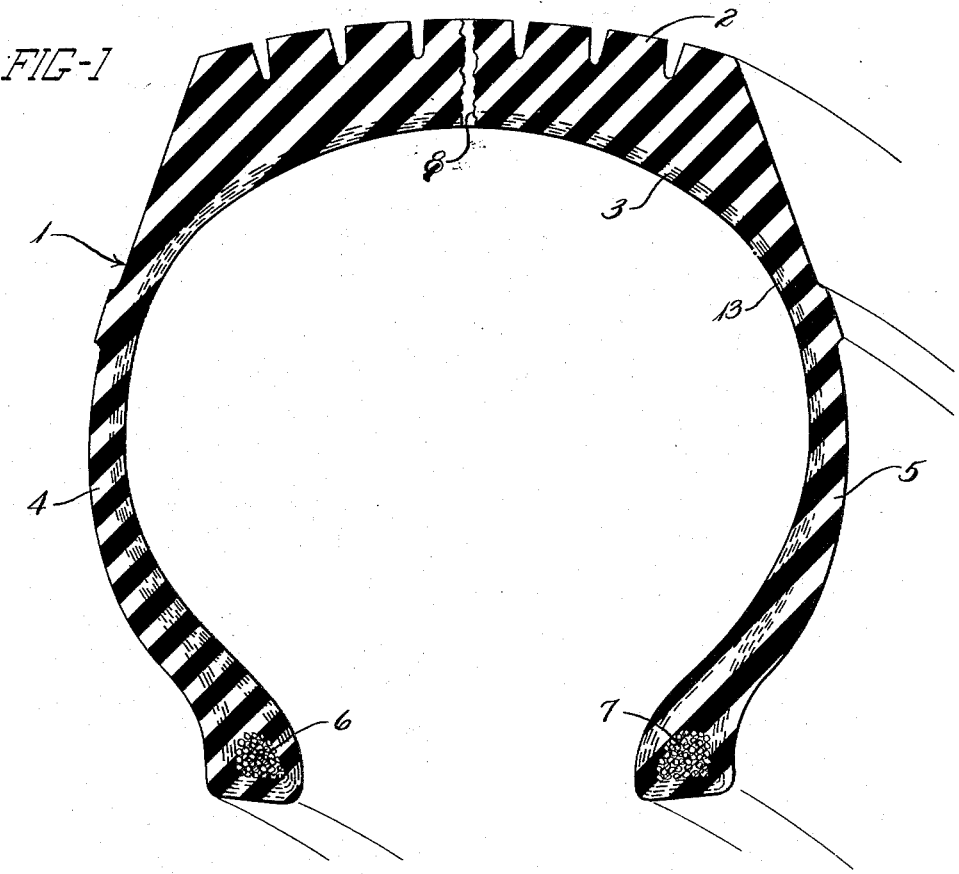
Figure 1 is a transverse sectional view of the tire showing the injury before repair.
Figure 2:
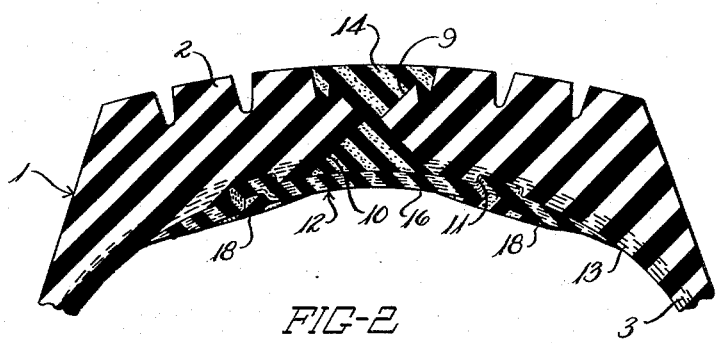
Figure 2 is a fragmentary transverse sectional view of the repair before vulcanization with the repair patch in place.

Figure 5 is a fragmentary sectional view showing a modification of the invention in which the cord ends of the patch are vulcanized into a recess in the original tire body. With reference to Figure 1, an open bellied tire generally indicated at 1 is comprised of a tread portion 2, fabric body portion 3, rubbery sidewall portions 4 and 5 and inextensible bead portions 6 and 7 at the edges of the tire body.

An injury comprising a break through the fabric cords of the tire is shown at 8 and it is to the repair of this injury that the invention is directed.

To repair the break in the tire, fabric is cut from the tire body and rubber from the tire tread around the break to form a hole which when viewed in section has beveled walls 9 and 10 resembling an hour glass.

In the present invention a recess 11 is cut in the tire body through the band ply in spaced relation to the opening of the hole. The purpose of this recess is to receive and lock the plies of fabric patch 12 so that the edges thereof will not be pulled inwardly along the belly of the tire towards the repair and thereby loosened during road operation of the tire.

A thin coat of tacky rubbery cement adhesively compatible with the rubber of the tread 2 and rubberized fabric of the tire body 3 is spread over the walls 9 and 10 of the hole as well as over the band ply 13 on the tire belly and the walls of the recess 11. After the cement has dried leaving a tacky surface the hole is filled with tacky unvulcanized rubber 14 with care being taken that the unvulcanized rubber is firmly adhered to the beveled walls of the hole and that no air is trapped between the rubber and the walls. A patch 12 of fabric coated with tacky unvulcanized rubber is centered over the hole and pressed against the cemented band ply on the belly of the tire and firmly adhered thereto by stitching, pressing or the like so that the cords of the patch are adhered to the walls of the recess 11. To cover the indentation in the outer surface 16 of the patch, strips of tacky unvulcanized rubbery material 18 are placed in the indentation and firmly pressed and stitched to adhere to the patch.

The repaired tire is now subjected to the heat and pressure of vulcanization while a smooth expandable surface is pressed against the outer surface 16 of the patch to force it to generally conform to the contour of the belly of the tire. It will be seen that the portions of the patch which are pressed into the recess 11 are vulcanized to the surface of the recess. The recess which preferably extends laterally with respect to the cords of the patch, serves to mechanically lock the patch so that the strain on the patch from flexing of the tire is taken both by the vulcanized adhesion of the patch 12 to the tire band ply 13 and by the mechanical interlocking of the patch in the recess 11. This locking engagement relieves the strain on edges of the patch so that they do not pull loose as the tire flexes.

A modification of the invention is shown in Figure 5 wherein recess 20 is so located in relation to the injury hole and the size of patch 21 is such that extreme outer edges 22 of the patch are forced onto the recess during vulcanization. Indentations at edges 22 of the patch are filled with strips 23 of tacky unvulcanized rubber and the entire surface smoothed out during vulcanization to blend with the contour of the inner surface of the belly of the tire.

The depth of the recess 11 or 20 may vary with the size of the tire being repaired. However, in the preferred form of the invention the depth of the recess is no greater than one half the thickness of the fabric body 3 and for best results is of a depth of between ⅛ and ½ the thickness of the tire carcass. Although the invention has been shown and described for use with a cross patch having arms, crossing at right angles, the invention is useful with patches such as the conventional rosette shaped patch having arms crossing at other than right angles. Obviously, the recess may be intermittent or continuous in extent with respect to the band ply of the tire with the controlling requirement being the size and shape of the patch used in that the recess preferably extends across all the patch arms.

Although a preferred form of the invention has been described, it is understood that other modifications lie within the scope of the invention with the only limitation being the extent of the knowledge of the prior art in view of the appended claims:

What is claimed is:

1. A previously injured but repaired open bellied tire comprised of a fabric body portion having a sealed opening in the fabric, said sealed opening having a vulcanized rubberized fabric patch across the face thereof, the belly surface of said tire having a trough in spaced relation to said opening, and said patch adhesively bonded to the belly of the tire and to the walls of said trough by vulcanization.

2. A method of repairing a break in the plied up fabric body of an open bellied tire comprising the steps of removing part of said fabric from around said break to form a hole having an opening in the surface of the belly of said tire, filling said hole with unvulcanized, vulcanizable rubbery material, cutting a trough in said fabric body through the surface of the belly thereof, adhering an unvulcanized vulcanizable rubberized fabric patch to the belly of said tire over said hole to engage said material, forcing a portion of said patch into adhesive engagement with the walls of said trough and vulcanizing said patch and rubbery material with heat and pressure.

3. A method of repairing a break in the plied up fabric body of an open bellied tire according to claim 2 in which the trough is cut for a distance of 360° around the hole.

4. A method of repairing a break in the plied up fabric body of an open bellied tire according to claim 2 wherein the patch has its outer cord edge vulcanized against the walls of said trough.

5. A method of repairing a break in the plied up fabric body of a tire according to claim 2 wherein the trough is no deeper than one half the thickness of the tire body.

6. A method of repairing a break in the plied up fabric body of a tire according to claim 2 wherein the trough has a depth of from ⅛ to ½ the thickness of the tire body.

References Cited in the file of this patent
UNITED STATES PATENTS 1,591,817    Hawkinson _____ July 6, 1926